United States Patent
Takei et al.

(10) Patent No.: US 6,191,220 B1
(45) Date of Patent: *Feb. 20, 2001

(54) METHOD FOR MANUFACTURING HYDROCARBON OXYSILYL FUNCTIONAL POLYMER

(75) Inventors: Kasumi Takeuchi Kasumi Takei; Mamoru Tachikawa, both of Kanagawa (JP)

(73) Assignee: Dow Corning Asia, Ltd., Tokyo (JP)

( * ) Notice: Under 35 U.S.C. 154(b), the term of this patent shall be extended for 0 days.

This patent is subject to a terminal disclaimer.

(21) Appl. No.: 09/218,530

(22) Filed: Dec. 21, 1998

(30) Foreign Application Priority Data

Mar. 2, 1997 (JP) .................................. 10-49504

(51) Int. Cl.$^7$ .......................... C08F 8/00; C08F 83/00; C08F 275/00; C08F 7/04; C08G 77/06
(52) U.S. Cl. .................. 525/100; 556/479; 556/136; 525/288; 525/101; 528/15; 528/31; 528/32
(58) Field of Search ................... 525/100, 478, 525/288, 101; 556/136, 479; 528/15, 31

(56) References Cited

U.S. PATENT DOCUMENTS

| | | | |
|---|---|---|---|
| 3,441,534 | * 4/1969 | Knaub | 260/37 |
| 4,371,664 | * 2/1983 | Kato et al. | 525/100 |
| 4,599,394 | 7/1986 | Lucas . | |
| 4,614,812 | 9/1986 | Schilling, Jr. | 556/406 |
| 4,904,732 | 2/1990 | Iwahara et al. . | |
| 4,927,898 | * 5/1990 | King, III et al. | 528/27 |
| 5,047,492 | * 9/1991 | Weidner et al. | 528/15 |
| 5,416,147 | * 5/1995 | Takarada et al. | 524/399 |
| 5,512,640 | * 4/1996 | Osawa et al. | 525/476 |
| 5,580,925 | * 12/1996 | Iwahara et al. | 525/100 |
| 5,688,961 | * 11/1997 | Kushibiki et al. | 548/955 |
| 5,900,438 | * 9/1999 | Miyoshi et al. | 521/77 |
| 5,986,124 | * 11/1999 | Tachikawa et al. | 556/479 |

FOREIGN PATENT DOCUMENTS

| | | | |
|---|---|---|---|
| 2245187 | * 3/1972 | (DE) . | |
| 1359956 | * 7/1974 | (GB) . | |
| 57-190043 | 5/1981 | (JP) | C08L/71/00 |
| 9-355185 | * 5/1997 | (JP) . | |

* cited by examiner

Primary Examiner—David W. Wu
Assistant Examiner—Tanya Zalukaeva
(74) Attorney, Agent, or Firm—William F. Boley; Jennifer S. Warren

(57) ABSTRACT

A method for making a hydrocarbon oxysilyl functional polymer, which is important as a modified silicone or silicone-modified polymer, by a hydrosilylation reaction between a hydride (hydrocarbonoxy)silane compound having SiH functional groups and a polymer having olefinic or acetylenic unsaturated groups in the presence of a carboxylic acid and a catalytic amount of platinum or a platinum compound.

11 Claims, No Drawings

METHOD FOR MANUFACTURING HYDROCARBON OXYSILYL FUNCTIONAL POLYMER

BACKGROUND OF INVENTION

The present invention is a method for efficiently manufacturing a polymer having hydrocarbon oxysilyl groups from a hydride (hydrocarbonoxy)silane compound and an unsaturated polymer having olefin or acetylene groups.

Alkoxysilyl modified silicones, alkoxysilyl functional polyolefins, and other such polymers having hydrocarbon oxysilyl groups are materials that have important industrial applications, such as the improvement of surface adhesion between a silanol produced by hydrolysis and a solid surface through the reaction or interaction of the polar groups thereon, or curing by the formation of crosslinks between polymer chains by the formation of siloxane bonds as a result of the hydrolysis of silyl groups and subsequent dehydration/condensation.

A polymer having alkoxysilyl groups, which are typical hydrocarbonoxysilyl groups, can be manufactured by methods broadly classified into the following two groups. The first method involves copolymerizing the monomer that is the principal raw material of the polymer with a comonomer having alkoxysilyl groups on a portion thereof, with a hydro-crosslinkable polyolefin being an example of the polymer that is obtained. A reactive comonomer having alkoxysilyl groups is essential in conducting this method. Also, since alkoxysilyl groups are generally highly reactive and susceptible to hydrolysis, limits are imposed on the reaction conditions, and not all polymers can be used with this method.

The second method involves the hydrosilylation reaction of a polymer having olefinic or acetylenic unsaturated groups with a hydride alkoxysilane compound. Specific examples include the introduction of alkoxysilyl functional groups into a double-terminated vinyl functional polydimethylsiloxane through a hydrosilylation reaction using a trialkoxysilane (U.S. Pat. No. 4,599,394); the introduction of trialkoxysilyl functional groups into a double-terminated allyl functional polyisobutylene through a hydrosilylation reaction using a trialkoxysilane (Japanese Laid-Open Patent Application 63-6041); and the introduction of dialkoxysilyl functional groups into a double-terminated allyl functional polyethylene glycol through a hydrosilylation reaction using a methyldialkoxysilane (Japanese Laid-Open Patent Application 57-190043). However, because the unsaturated group concentration in these polymers was low and the reaction was slow, the above reactions generally had to be conducted by using a large excess of hydroalkoxysilane compound and a large amount of hydrosilylation catalyst. Also, oxygen frequently had to be added to the reaction atmosphere during the hydrosilylation reaction in order for catalytic activity to be manifested and sustained. The addition of oxygen was attended by the danger of ignition and explosion.

An object of the present invention is to provide a novel method for manufacturing a polymer having hydrocarbonoxysilyl groups through a hydrosilylation reaction using a hydride (hydrocarbonoxy)silane compound, which method has a wider range of applicability and a simpler procedure than the above two methods. Specifically, the present invention provides a method where the proportion of hydrocarbonoxysilyl groups that are bonded to primary carbons of the polymer can be raised and the proportion of those bonded to secondary carbons can be lowered by an improvement to the selectivity of the addition position in the hydrosilylation reaction, and which thus makes it possible to obtain a polymer that is more readily hydrolyzed and that contains more hydrocarbon oxysilyl groups. The present invention also provides a method with which a platinum catalyst is more highly activated and the activity thereof is sustained better, which makes it possible to perform the hydrosilylation reaction more economically and to carry out this reaction at a lower oxygen partial pressure or in an inert atmosphere, and thus allows the danger of ignition or explosion to be reduced during the hydrosilylation reaction.

Specifically, an object of the present invention is to provide a method where, in the introduction of hydrocarbon oxysilyl groups into a polymer through a hydrosilylation reaction between a hydride (hydrocarbonoxy)silane compound and unsaturated groups bonded to the polymer, (1) the activity of a platinum catalyst can be raised, the activity sustained longer, and the catalyst costs reduced; (2) the position selectivity in the reaction can be enhanced, and the hydrocarbonoxysilyl groups that are bonded to the primary carbons of the polymer can thus be provided more selectively; and (3) the hydrosilylation reaction can be carried out at a lower oxygen partial pressure or in an inert atmosphere, and thus the danger of ignition or explosion during the hydrosilylation reaction can be reduced.

The inventors discovered that catalytic activity, how long this activity is sustained, and reaction selectivity can be greatly improved and a hydrosilylation reaction can be accomplished quickly in the absence of oxygen or at a low oxygen partial pressure by having a small amount of carboxylic acid compound be present in the reaction system in the course of adding a hydride (hydrocarbonoxy)silane compound, whose reactivity is low when used alone, to an olefinic or acetylenic functional polymer in a hydrosilylation reaction in which a platinum catalyst is used.

SUMMARY OF INVENTION

A method for making a hydrocarbon oxysilyl functional polymer, which is important as a modified silicone or silicone-modified polymer, by a hydrosilylation reaction between a hydride (hydrocarbonoxy)silane compound having SiH functional groups and a polymer having olefinic or acetylenic unsaturated groups in the presence of a carboxylic acid and a catalytic amount of platinum or a platinum compound.

DESCRIPTION OF INVENTION

The present invention is a method for making a hydrocarbonoxysilyl functional polymer, in which an olefinic or acetylenic unsaturated-group polymer is reacted with a hydride (hydrocarbonoxy)silane compound described by formula

$$HSiR_n(OR')_{3-n} \quad (1)$$

in the presence of platinum or platinum compound catalyst and a carboxylic acid compound; where each R is an independently selected organic group comprising 1 to 10 carbon atoms, each R' is an independently selected hydrocarbon group comprising 1 to 10 carbon atoms, and n is 0, 1, or 2.

The hydride (hydrocarbonoxy)silane compound used in the present invention is described by formula (1), and is a silicon compound having a hydrogen atom bonded directly to a silicon atom and having at least one hydrocarbonoxy group described by OR' bonded to the silicon atom. Mutually different hydrocarbonoxy groups may be bonded to the same silicon atom. In formula (1), each R' is an independently selected hydrocarbon group comprising 1 to 10 carbon atoms; each R group is an independently selected organic group comprising 1 to 10 carbon atoms. R can be, for example either of the following (1) or (2):

(1) A hydrocarbon group with 1 to 10 carbon atoms (2) A hydrocarbon group in which a carbon atom and a hetero atom other than a hydrogen atom are bonded, with the total number of carbon atoms being between 1 and 10. Examples of the hetero atom include oxygen, nitrogen, sulfur, fluorine, chlorine, bromine, iodine, and silicon. The bonding position of the hetero atom in the hydrocarbon group may be a terminal group, a side chain, or the main chain skeleton.

As to R, when n=2, mutually different hydrocarbon groups may be bonded to the same silicon atom. Of the above-mentioned hydrocarbon groups, it is preferable for R to be an alkyl group.

Examples of R' include a methyl, ethyl, n-propyl, isopropyl, n-butyl, t-butyl, pentyl, hexyl, octyl, decyl, and other alkyl groups; 2-propenyl, hexenyl, octenyl, and other alkenyl groups; a benzyl, phenethyl, and other aralkyl groups; and a phenyl, tolyl, xylyl, and other aryl groups.

Examples of R include those described above for R', as well as chloromethyl, 4-chlorophenyl, trimethylsilylmethyl, and 2-methoxyethyl.

Specific examples of the hydride (hydrocarbonoxy)silane compound include the following, although this list is not comprehensive: trihydrocarbon oxysilanes such as trialkoxysilanes, trialkenoxysilanes, and triaryloxysilanes, specific examples of which include trimethoxysilane, triethoxysilane, tri-n-propoxysilane, triisopropoxysilane, tributoxysilane, triisopropenoxysilane, and triphenoxysilane; dihydrocarbon oxysilanes such as dialkoxysilanes, dialkenoxysilanes, and diaryloxysilanes, specific examples of which include methyldimethoxysilane, methyldiethoxysilane, methyldi-n-propoxysilane, methyldiisopropenoxysilane, methyldiphenoxysilane, ethyldimethoxysilane, ethyldiethoxysilane, n-propyldimethoxysilane, n-propyldiethoxysilane, methyldioctyloxysilane, 3,3,3-trifluoropropyldimethoxysilane, 3,3,3-trifluoropropyldiethoxysilane, n-hexyldimethoxysilane, n-hexyldiethoxysilane, n-octyldimethoxysilane, n-octyldiethoxysilane, benzyldimethoxysilane, benzyldiethoxysilane, phenethyldimethoxysilane, phenethyldiethoxysilane, phenyldimethoxysilane, and phenyldiethoxysilane; monohydrocarbon oxysilanes such as monoalkoxysilanes, monoalkenoxysilanes, and monoaryloxysilanes, specific examples of which include dimethylmethoxysilane, dimethylethoxysilane, dimethyl-n-propoxysilane, dimethylisopropenoxysilane, dimethylphenoxysilane, diethylmethoxysilane, methylethylethoxysilane, n-propyl(methyl)methoxysilane, n-propyl(methyl)ethoxysilane, 3,3,3-trifluoropropyl (methyl)methoxysilane, bis(3,3,3-trifluoropropyl) ethoxysilane, n-hexyl(methyl)methoxysilane, di(n-hexyl) ethoxysilane, n-octyl(methyl)methoxysilane, di(n-octyl) ethoxysilane, benzyl(methyl)methoxysilane, phenethyl (methyl)methoxysilane, and methylphenylmethoxysilane; hydrocarbon oxysilanes having two or more hydrocarbon oxy groups with different structures such as alkoxy groups, alkenoxy groups, aralkyloxy groups, and aryloxy groups, such as methoxydiethoxysilane, diethoxypropenoxysilane, dimethoxyphenoxysilane, dimethoxybenzyloxysilane, diphenoxypropenoxysilane, and methylmethoxyphenethoxysilane; and these silane compounds in which R has been substituted with a chloromethyl group, 4-chlorophenyl group, trimethylsilylmethyl group, 2-methoxyethyl group, or the like.

These hydride (hydrocarbonoxy)silane compounds are selected according to the reactivity thereof or as dictated by the intended application of the hydrocarbon oxysilyl functional polymer to be manufactured, but an alkoxysilane is usually preferable from the standpoint of reactivity.

The amount of hydride (hydrocarbonoxy)silane compound used in the reaction may be an equivalent with the unsaturated groups bonded to the above-mentioned unsaturated group-containing polymer, but an excess amount within a range of about 1.1 to 100 gram equivalents per mole of unsaturated groups of the polymer may be added in order to accelerate the reaction and bring it to a conclusion, and then removed after the reaction.

The carboxylic acid compound used in the present invention can be any of the following a, b, c, or d:

a. A carboxylic acid, with there being no particular restrictions as long as it has carboxyl groups. Examples include saturated carboxylic acids, unsaturated carboxylic acids, monocarboxylic acids, and dicarboxylic acids. A saturated or unsaturated aliphatic hydrocarbon group, aromatic hydrocarbon group, halogenated hydrocarbon group, hydrogen atom, or the like is usually selected as the portion other than the carboxyl groups in these carboxylic acids;

b. An anhydride of a carboxylic acid;

c. A silylated carboxylic acid; and d. A substance that will produce the above-mentioned carboxylic acid compounds of a, b, or c through a reaction or decomposition in the present method in the course of the hydrosilylation reaction.

The carboxylic acid compound must be present in the present method while the hydrosilylation reaction occurs, so it must be added to the method before the start of the hydrosilylation reaction or at some point up to the initial stage of the reaction.

As mentioned above, a carboxylic acid, a silylated carboxylic acid, or an anhydride of a carboxylic acid is suitable as the carboxylic acid compound used in the hydrosilylation method of the present invention, but it is also acceptable to use a substance that will produce one of the above-mentioned carboxylic acid compounds through a reaction or decomposition in the reaction system. In specific terms, examples of carboxylic acids include saturated monocarboxylic acids such as formic acid, acetic acid, propionic acid, n-butyric acid, isobutyric acid, hexanoic acid, cyclohexanoic acid, lauric acid, and stearic acid; saturated dicarboxylic acids such as oxalic acid and adipic acid; aromatic carboxylic acids such as benzoic acid and para-phthalic acid; carboxylic acids in which the hydrogen atoms of the hydrocarbon groups of these carboxylic acids have been substituted with a halogen atom or an organosilyl group, such as chloroacetic acid, dichloroacetic acid, trifluoroacetic acid, para-chlorobenzoic acid, and trimethylsilylacetic acid; unsaturated fatty acids such as acrylic acid, methacrylic acid, and oleic acid; and compounds having hydroxy groups, carbonyl groups, or amino groups in addition to carboxyl groups, namely, hydroxy acids such as lactic acid, keto acids such as acetoacetic acid, aldehyde acids such as glyoxylic acid, and amino acids such as glutamic acid.

Specific examples of silylated carboxylic acids include trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, vinyltriacetoxysilane, and silicon tetrabenzoate.

Examples of anhydrides of carboxylic acids include acetic anhydride, propionic anhydride, and benzoic anhydride. Examples of substances that produce one of the above-mentioned carboxylic acid compounds through a reaction or decomposition in the reaction system include acetyl chloride, butyryl chloride, benzoyl chloride, and other carboxylic acid halides, carboxylic acid metal salts such as zinc acetate and thallium acetate, and carboxylic esters that are decomposed by light or heat, such as (2-nitrobenzyl) propionate.

It is preferable for the above-mentioned carboxylic acid compound to be selected from among the above-mentioned carboxylic acids or the above-mentioned silylated carboxylic acids.

These carboxylic acid compounds can be used effectively by being added to the present reaction system in an amount of 0.001 to 20 Wt. %, but for the purpose of achieving a good effect and using the compound efficiently, an amount between 0.01 and 5 Wt. % should be added. "Reaction system" here refers to the mixture composed of the hydride (hydrocarbonoxy)silane compound, the unsaturated group-containing polymer, the platinum or platinum compound catalyst, and the above-mentioned carboxylic acid compound that are used in the present method.

The platinum compound that serves as the catalyst component can be selected from among complexes having a negative electrical charge and zero-valent, divalent, and tetravalent platinum compounds and platinum colloids. In specific terms, examples of complexes having a negative electrical charge include platinum carbonyl cluster anion compounds, such as $[Pt_3(CO)_6]^{2-}$, $[Pt_3(CO)_6]_2^{2-}$, and $[Pt_3(CO)_6]_4^{2-}$, platinum compounds include a platinum (0) divinyltetramethyldisiloxane complex, a platinum (0) ethylene complex, and a platinum (0) styrene complex, examples of divalent platinum compounds include $Pt(II)Cl_2$, $Pt(II)Br_2$, bis(ethylene)$Pt(II)Cl_2$, (1,5-cyclooctadiene)$Pt(II)Cl_2$, platinum(II) acetylacetonate, and bis(benzonitrile)$Pt(II)Cl_2$, and examples of tetravalent platinum compounds include $Pt(IV)Cl_4$, $H_2Pt(IV)Cl_6$, $Na_2Pt(IV)Cl_6$, and $K_2Pt(IV)Cl_6$. Of these, an alcohol solution of a platinum (0) divinyltetramethyldisiloxane complex and chloroplatinic acid is particularly favorable from the standpoints of solubility in organic solvents, stability of the catalyst solution, and other usage aspects. The amount of platinum required for a hydrosilylation reaction of a specific amount of substrate is related to the type of substrate, the reaction temperature, the reaction time, and other such factors, and as such cannot be unconditionally set forth, but $10^{-3}$ to $10^{-8}$ mol of platinum can generally be used per mole of the hydride (hydrocarbonoxy) silane compound, and using between $10^{-4}$ and $10^{-7}$ mol is preferable from the standpoint of the cost of the catalyst and the reaction time.

The above-mentioned polymer containing unsaturated groups is a concept that encompasses oligomers. This refers, however, to a degree of polymerization of at least 3 in the polysiloxanes discussed below. In these polymers, the unsaturated groups contained in the polymer may be at the polymer terminals or on side chains; examples of olefinic unsaturated groups include vinyl, vinylidene, allyl, hexenyl, and other such unsaturated groups. The acetylenic unsaturated groups include terminal acetylene groups and internal acetylene groups.

Specific examples of polymers to which unsaturated groups are bonded include polyolefins such as polyethylene, polypropylene, polybutene-1, polyisobutylene, polystyrene, polymethyl methacrylate, polyvinyl chloride, and polyisoprene; polyethers such as polyoxymethylene, polyethylene glycol, polypropylene glycol, and polyphenylene oxide; polyesters such as polyethylene terephthalate, polycarbonates such as those having bisphenol A as a raw material, polyurethanes, polyamides such as nylon, polyimides such as captone, and polysiloxanes with a degree of polymerization of at least 3 such as polydimethylsiloxane. The olefinic unsaturated group or acetylenic unsaturated group bonded to the polymer can be bonded to just one terminal of the polymer, bonded to both terminals, present as a side chain, and bonded to both terminals and side chains.

The above-mentioned polymer having unsaturated groups should preferably be selected from among polysiloxanes with a degree of polymerization of at least 3 having olefinic unsaturated groups, polyolefins having olefinic unsaturated groups, and polyethers having olefinic unsaturated groups. This polysiloxane may have a structure that is either linear or branched. Examples of linear polysiloxanes include polysiloxane compounds having an olefinic unsaturated group at one end such as single-terminated vinyl functional polydimethylsiloxanes, single-terminated hexenyl functional polydimethylsiloxane, single-terminated vinyl functional polydiphenylsiloxane, and single-terminated vinyl functional polymethylphenylsiloxane; polysiloxane compounds having olefinic unsaturated groups at both ends such as double-terminated vinyl functional polydimethylsiloxane, double-terminated hexenyl functional polydimethylsiloxane, double-terminated vinyl functional polydiphenylsiloxane, and double-terminated vinyl functional polymethylphenylsiloxane; and polysiloxane compounds having an olefinic unsaturated group on a side chain such as poly(dimethylsiloxane-methylvinylsiloxane) copolymers and poly(dimethylsiloxanemethylallylsiloxane) copolymers. Examples of branched polysiloxanes include those having methylsilsesquioxane units ($CH_3SiO_{3/2}$) and those having silicate units ($SiO_{4/2}$) and having the above-mentioned unsaturated groups, specific examples of which include copolymers of $CH_2=CH(CH_3)_2SiO_{1/2}$, $(CH_3)_2SiO_{2/2}$, and $CH_3SiO_{3/2}$, copolymers of $CH_2=CH(CH_3)_2SiO_{1/2}$, and $SiO_{4/2}$ and copolymers of $CH_2=CH(CH_3)_2SiO_{1/2}$ and $C_6H_5SiO_{3/2}$.

Examples of polyolefins include polyolefin compounds having an olefinic unsaturated group at one end such as single-terminated vinyl functional polyethylene, single-terminated vinylidene functional polypropylene, and single-terminated allyl functional polyisobutylene and polyolefin compounds having olefinic unsaturated groups at both ends such as double-terminated vinyl functional polyethylene, double-terminated vinylidene functional polypropylene, and double-terminated allyl functional polyisobutylene.

Examples of polyethers include single-terminated allyl functional polyethylene glycol, double-terminated allyl functional polyethylene glycol, single-terminated allyl functional polypropylene glycol, and a double-terminated allyl functional polypropylene glycol polyethylene glycol copolymer.

The hydrocarbonoxysilyl functional polymer made by the present method has a structure in which a hydrocarbonoxysilyl group is bonded to the polymer. The bonding position of this hydrocarbonoxysilyl group corresponds to the position of the unsaturated group on the starting polymer, specific examples of which are at one end of the polymer, at both ends, at a side chain, and at both a side chain and the ends.

The structure of the hydrocarbonoxysilyl groups bonded to the polymer originates in the structure of the hydride (hydrocarbonoxy)silane compound used as the starting material, and can be trihydrocarbonoxysilyl groups, dihydrocarbonoxysilyl groups, or monohydrocarbonoxysilyl groups.

The reaction temperature in the present method should be between 0 and 300° C., but a range of 30 to 250° C. is ideal in terms of achieving a good reaction velocity and the stability of the product and the substrates participating in the reaction.

There is no fundamental need to use a solvent in the present, but a hydrocarbon compound can be used as a solvent for the reaction or a solvent for the catalyst component in order to facilitate the addition of the catalyst component and the control of the reaction system temperature, or to dissolve the substrates. Examples of solvents that are ideal for this purpose include saturated or unsaturated hydrocarbon compounds, such as hexane, cyclohexane, heptane, octane, dodecane, benzene, toluene, xylene, and dodecylbenzene; halogenated hydrocarbon compounds, such as chloroform, methylene chloride, chlorobenzene, and ortho-dichlorobenzene; ethers, such as ethyl ether, tetrahydrofuran, and ethylene glycol dimethyl ether; and silicones, such as hexamethyldisiloxane and dimethylpolysiloxane.

The present invention will now be described in detail through working examples, but the present invention is not limited to or by these examples. The experiments in the working and comparative examples were all carried out in a nitrogen atmosphere.

The NMR mentioned in the discussion of the characteristics of the products in the following examples stands for nuclear magnetic resonance.

The alkoxysilane compounds, alkylsilane compounds, and siloxane compounds used in these working examples were all commercially available products or were synthesized by a known method. The unsaturated compounds were used in as-purchased form.

Working Example 1 (reaction between α,ω-divinylpolydimethylsiloxane and trimethoxysilane in the presence of acetic acid). A glass reaction tube purged with nitrogen was sealed with polytetrafluoroethylene tape and a septum. 2.5 g of α,ω-divinylpolydimethylsiloxane (average degree of polymerization: 39) and 0.27 g of trimethoxysilane were placed in this vessel, to which 5 μL of acetic acid was added. To this was added 5 μL of a toluene solution of a zero-valent platinum complexed with divinyltetramethyldisiloxane (platinum content: 0.04 Wt. %). The vessel was placed in a 60° C. oil bath and heated for 1 hour. After cooling, the contents were analyzed by proton NMR, which revealed that the conversion rate of the vinyl groups of the siloxane was 91%, 85% of the vinyl groups had been hydrosilylated, and the ratio of the (trimethoxysilyl)ethyl groups ($-CH_2CH_2Si(OCH_3)_3$) and the methyl (trimethoxysilyl)methyl groups ($-CHCH_3(Si(OCH_3)_3)$) thus produced was 35:1.

Comparative Example 1 (reaction between α,ω-divinylpolydimethylsiloxane and trimethoxysilane in the absence of a carboxylic acid compound). A glass reaction tube purged with nitrogen was sealed with polytetrafluoroethylene tape and a septum. 2.5 g of α,ω-divinylpolydimethylsiloxane (average degree of polymerization: 39) and 0.27 g of trimethoxysilane were placed in this vessel. To this was added 5 μL of a toluene solution of a zero-valent platinum complexed with divinyltetramethyldisiloxane (platinum content: 0.04 Wt. %). The vessel was placed in a 60° C. oil bath and heated for 1 hour. After cooling, the contents were analyzed by proton NMR, which revealed that the conversion rate of the vinyl groups of the siloxane was 11 %, 9.6 % of the vinyl groups had been hydrosilylated, and the ratio of the (trimethoxysilyl)ethyl groups ($-CH_2CH_2Si(OCH_3)_3$) and the methyl (trimethoxysilyl)methyl groups ($-CHCH_3(Si(OCH_3)_3)$) thus produced was 6:1.

Working Example 2 (reaction between double-terminated allyl functional polyisobutylene and trimethoxysilane using a platinum catalyst in the presence of acetic acid). A glass reaction tube purged with nitrogen was sealed with polytetrafluoroethylene tape and a septum. 2.0 g of double-terminated allyl functional polyisobutylene (average degree of polymerization: 5100) and 0.18 g of trimethoxysilane were added to this vessel, to which 0.005 mL of acetic acid was added. To this was added 5 μL of a toluene solution of zero-valent platinum complexed with divinyltetramethyldisiloxane (platinum content: 0.04 Wt. %). The vessel was placed in a 50° C. oil bath and heated for 2 hours. After cooling, the contents were analyzed by proton NMR, which revealed that the conversion rate of the allyl groups was 60%, and terminal trimethoxysilyl groups had been produced at a yield of 56%.

Comparative Example 2 (reaction between double-terminated allyl functional polyisobutylene and trimethoxysilane in the absence of a carboxylic acid compound). A glass reaction tube purged with nitrogen was sealed with polytetrafluoroethylene tape and a septum. 2.0 g of double-terminated allyl functional polyisobutylene and 0.18 g of trimethoxysilane were added to this vessel, to which was added 5 μL of a toluene solution of zero-valent platinum complexed with divinyltetramethyldisiloxane (platinum content: 0.04 Wt. %). The vessel was placed in a 50° C. oil bath and heated for 20 hours. After cooling, the contents were analyzed by proton NMR, which revealed that the conversion rate of the allyl groups was 0%.

Working Example 3 (reaction between double-terminated allyl functional polyethylene glycol and methyldimethoxysilane in the presence of propionic acid). A glass reaction tube purged with nitrogen was sealed with polytetrafluoroethylene tape and a septum. 3.7 g of double-terminated allyl functional polyethylene glycol (average degree of polymerization: 550) and 0.8 g of methyldimethoxysilane were added to this vessel, to which 0.010 mL of propionic acid was added. To this was added 10 μL of a toluene solution of zero-valent platinum complexed with divinyltetramethyldisiloxane (platinum content: 0.04 Wt. %). The vessel was placed in a 50° C. oil bath and heated for 20 hours. After cooling, the contents were analyzed by proton NMR, which revealed that the conversion rate of the terminal allyl groups was 42%, and methyldimethoxysilyl groups had been produced at a yield of 56%.

Comparative Example 3 (reaction between double-terminated allyl functional polyethylene glycol and methyldimethoxysilane in the absence of a carboxylic acid compound). A glass reaction tube purged with nitrogen was sealed with polytetrafluoroethylene tape and a septum. 3.6 g of double-terminated allyl functional polyethylene glycol (average degree of polymerization: 550) and 0.8 g of methyldimethoxysilane were added to this vessel, to which was added 10 μL of a toluene solution of zero-valent platinum complexed with divinyltetramethyldisiloxane (platinum content: 0.04 Wt. %). The vessel was placed in a 50° C. oil bath and heated for 20 hours. After cooling, the contents were analyzed by proton NMR, which revealed that the conversion rate of the terminal allyl groups was 21%, and methyldimethoxysilyl groups had been produced at a yield of 11%.

Working Example 4 (reaction between α,ω-divinylpolydimethylsiloxane and methyldiethoxysilane in the presence of methyldiacetoxysilane). A glass reaction tube purged with nitrogen was sealed with polytetrafluoroethylene tape and a septum. 2.2 g of α,ω-divinylpolydimethylsiloxane (average degree of polymerization: 9.5), 0.9 g of methyldiethoxysilane, and 14.9 mg of methyldiacetoxysilane were added to this. To this was added 5 μL of a toluene solution of zero-valent platinum complexed with divinyltetramethyldisiloxane (platinum content: 0.04 Wt. %). The vessel was placed in a 60° C. oil bath and heated for 60 minutes. After cooling, the contents were analyzed by proton NMR, which revealed that the conversion rate of the vinyl groups of the siloxane was 96%, 95.3% of the vinyl groups had been hydrosilylated, and the ratio of the (methyldiethoxysilyl)ethyl groups (—CH$_2$CH$_2$Si(OC$_2$H$_5$)$_2$CH$_3$) and the methyl(diethoxysilyl)methyl groups (CHCH$_3$(Si(OC$_2$H$_5$)$_2$CH$_3$)) thus produced was 58:1.

Comparative Example 4 (reaction between α,ω-divinylpolydimethylsiloxane and methyldiethoxysilane in the absence of a carboxylic acid compound). A glass reaction tube purged with nitrogen was sealed with polytetrafluoroethylene tape and a septum. 2.2 g of α,ω-divinylpolydimethylsiloxane (average degree of polymerization: 9.5) and 0.9 g of methyldiethoxysilane were added to this vessel. To this was added 5 μL of a toluene solution of zero-valent platinum complexed with divinyltetramethyldisiloxane (platinum content: 0.04 Wt. %). The vessel was placed in a 60° C. oil bath and heated for 60 minutes. After cooling, the contents were analyzed by proton NMR, which revealed that the conversion rate of the vinyl groups of the siloxane was 4%, 3.4% of the vinyl groups had been hydrosilylated, and the ratio of the (methyldiethoxysilyl)ethyl groups (—CH$_2$CH$_2$Si(OC$_2$H$_5$)$_2$CH$_3$) and the methyl(diethoxysilyl)methyl groups (—CHCH$_3$(Si(OC$_2$H$_5$)$_2$CH$_3$)) thus produced was 5:1.

Working Example 5 (reaction between vinyl functional silicone resin and trimethoxysilane using a platinum catalyst in the presence of acetic acid). 0.54 g of vinyl functional silicone resin ((ViMe$_2$SiO$_{1/2}$)$_{0.6}$ (MeSiO$_{3/2}$)$_{0.6}$ (SiO$_{4/2}$)), 0.36 g of trimethoxysilane, and 0.45 g of toluene were placed in a glass reaction tube, to which was added 0.002 mL of a toluene solution of zero-valent platinum complexed with divinyltetramethyldisiloxane (platinum content: 0.4 Wt. %). The reaction tube was sealed with Teflon tape and a rubber septum and then placed in a 50° C. oil bath and heated for 3 hours. After cooling, the contents were analyzed by proton NMR, which revealed that 99.5% of the vinyl groups had been hydrosilylated, and the ratio of the (trimethoxysilyl)ethyl groups (—CH$_2$CH$_2$Si(OCH$_3$)$_3$) and the ethyl(trimethoxysilyl)methyl groups (—CHCH$_3$(Si(OCH$_3$)$_3$)) was 39:1. (Vi means a vinyl group, and Me methyl group; the same applies hereinafter.)

Comparative Example 5 (reaction between vinyl functional silicone resin and trimethoxysilane using a platinum catalyst in the absence of a carboxylic acid compound). 0.54 g of vinyl functional silicone resin ((ViMe$_2$SiO$_{1/2}$)$_{0.6}$ (MeSiO$_{3/2}$)$_{0.6}$ (SiO$_{4/2}$)), 0.36 g of trimethoxysilane, and 0.45 g of toluene were placed in a glass reaction tube, to which was added 0.002 mL of the toluene solution of zero-valent platinum complexed with divinyltetramethyldisiloxane (platinum content: 0.4 Wt. %). The reaction tube was sealed with Teflon tape and a rubber septum and then placed in a 50° C. oil bath and heated for 3 hours. After cooling, the contents were analyzed by proton NMR, which revealed that 85% of the vinyl groups had been hydrosilylated, and the ratio of the (trimethoxysilyl)ethyl groups (—CH$_2$CH$_2$Si(OCH$_3$)$_3$) and the methyl(trimethoxysilyl)methyl groups (—CHCH$_3$(Si(OCH$_3$)$_3$)) was 7:1.

We claim:

1. A method for making a hydrocarbonoxysilyl functional polymer comprising reacting a polymer having olefinic or acetylenic unsaturated groups with a hydride (hydrocarbonoxy) silane compound described by formula $$HR_nSi(OR^1)_{3-n}$$

in the presence of platinum or platinum compound catalyst and a silylated carboxylic acid compound; where each R is an independently selected hydrocarbon group comprising 1 to 10 carbon atoms, each $R^1$ is an independently selected hydrocarbon group comprising 1 to 10 carbon atoms, and n is 0,1 or 2, wherein the platinum or platinum compound catalyst is a complex of chloroplatinic acid and divinyltetramethyldisiloxane.

2. A method according to claim 1, where the polymer having olefinic or acetylenic unsaturated groups is selected from the group consisting of polysiloxanes with a degree of polymerization of at least 3, polyolefins, and polyethers.

3. A method according to claim 1, where the hydride (hydrocarbonoxy)silane compound is an alkoxysilane.

4. A method according to claim 1, where the silylated carboxylic acid compound is present in the method in an amount of 0.001 to 20 weight percent of components.

5. A method according to claim 1, where the silylated carboxylic acid compound is present in the method in an amount of 0.01 to 5 weight percent of components added.

6. A method according to claim 1, where the polymer having olefinic or acetylenic unsaturated groups is selected from the group consisting of polyolefins, polyethers, polyesters, polyurethanes, polyamides, polyimides, and polysiloxanes with a degree of polymerization of at least 3.

7. A method according to claim 1, where the polymer having olefinic or acetylenic unsaturated groups is selected from the group consisting of polysiloxanes with a degree of polymerization of at least 3 having olefinic unsaturation, polyolefins having olefinic unsaturation, and polyethers having olefinic unsaturation.

8. A method according to claim 1, where the polymer having olefinic or acetylenic unsaturated groups is a polysiloxane with a degree of polymerization of at least 3 having olefinic unsaturation.

9. A method according to claim 7, where the olefinic unsaturation is a vinyl group.

10. A method according to claim 8, where the olefinic unsaturation is a vinyl group.

11. A method according to claim 1, where the polymer is reacted with the hydride (hydrocarbonoxy)silane at a temperature between 30 and 250° C.

* * * * *